United States Patent
Graham et al.

(10) Patent No.: US 11,473,508 B2
(45) Date of Patent: Oct. 18, 2022

(54) FLUSH-MOUNT COMBINED STATIC PRESSURE AND TEMPERATURE PROBE WITH FLOW ENHANCEMENT FEATURE

(71) Applicant: Rosemount Aerospace Inc., Burnsville, MN (US)

(72) Inventors: Lisa Graham, Prior Lake, MN (US); Robert Edward Sable, Lakeville, MN (US); Richard William Phillips, Eagan, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 369 days.

(21) Appl. No.: 16/818,355

(22) Filed: Mar. 13, 2020

(65) Prior Publication Data
US 2021/0285385 A1 Sep. 16, 2021

(51) Int. Cl.
| | | |
|---|---|---|
| G01L 19/00 | (2006.01) | |
| F02C 9/28 | (2006.01) | |
| F01D 17/08 | (2006.01) | |
| F01D 21/00 | (2006.01) | |

(52) U.S. Cl.
CPC .............. *F02C 9/28* (2013.01); *F01D 17/08* (2013.01); *F01D 17/085* (2013.01); *F01D 21/003* (2013.01); *G01L 19/0092* (2013.01)

(58) Field of Classification Search
None
See application file for complete search history.

(56) References Cited

U.S. PATENT DOCUMENTS

| | | | |
|---|---|---|---|
| 8,074,521 B2 | 12/2011 | Kurtz et al. | |
| 9,927,307 B2 | 3/2018 | Erlund | |
| 10,371,000 B1* | 8/2019 | Graham | ............... G01P 5/14 |
| 2004/0134282 A1* | 7/2004 | Hayashi | ............... G01K 7/22 |
| | | | 73/708 |
| 2019/0033141 A1 | 1/2019 | Costello et al. | |

FOREIGN PATENT DOCUMENTS

| | | |
|---|---|---|
| CN | 104034532 A | 9/2014 |
| CN | 204241219 U | 4/2015 |

OTHER PUBLICATIONS

Extended European Search Report dated Jul. 9, 2021, received for corresponding European Application No. 21151166.2, seven pages.

* cited by examiner

*Primary Examiner* — Lisa M Caputo
*Assistant Examiner* — Nigel H Plumb
(74) *Attorney, Agent, or Firm* — Kinney & Lange, P.A.

(57) ABSTRACT

A probe includes a probe head, a probe tip extending from the probe head and having a sensor in fluidic communication with a first fluid stream, a pressure channel extending into the probe tip through the sensor face with a pressure sensor that senses pressure in the pressure channel, and a temperature channel extending into the probe tip through the sensor face. The temperature channel including a temperature orifice disposed on the sensor face and at least one exit port distal from the sensor face. The temperature channel is parallel to and fluidly separate from the pressure channel and includes a temperature sensor that senses temperature in the temperature channel. The temperature channel directs fluid flow from the temperature orifice to the at least one exit port, thereby discharging fluid flow into a second fluid stream.

20 Claims, 6 Drawing Sheets

FLUSH-MOUNT COMBINED STATIC PRESSURE AND TEMPERATURE PROBE WITH FLOW ENHANCEMENT FEATURE

CROSS-REFERENCE TO RELATED APPLICATION(S)

This application is related to U.S. patent application Ser. No. 15/934,615, entitled "FLUSH-MOUNT COMBINED STATIC PRESSURE AND TEMPERATURE PROBE", filed Mar. 23, 2018, now U.S. Pat. No. 10,371,000.

BACKGROUND

The present disclosure relates generally to gas turbine engines, and more particularly to a sensor system of a gas turbine engine.

A gas turbine engine typically includes a high pressure spool, a combustion system, and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a fan connected to a forward end of the low pressure shaft, forward of the high pressure compressor. The combustion system is disposed between the high pressure compressor and the high pressure turbine and receives compressed air from the compressors and fuel provided by a fuel injection system. A combustion process is carried out within the combustion system to produce high energy gases to produce thrust and turn the high and low pressure turbines, which drive the compressor and the fan to sustain the combustion process.

An engine control system for the gas turbine engine can employ sensors that relay data relating to various properties of the engine and its operation. For example, the engine control system may want to know the working fluid temperature and pressure at particular points in the engine. These properties are measured by probes that are communicatively connected to the engine control system. The probes have a particular size, though, which occupies space and adds weight to the engine. In addition, the positioning of the probes can affect the flow of the working fluid, which can affect the measurements of other probes.

SUMMARY

A probe includes a probe head, a probe tip extending from the probe head and ending with a sensor face in fluidic communication with a first fluid stream, a pressure channel extending into the probe tip through the sensor face, a pressure sensor configured to sense a pressure in the pressure channel, a temperature channel extending into the probe tip through the sensor face with a temperature orifice located on the sensor face and at least one exit port distal from the sensor face, and a temperature sensor configured to sense a temperature in the temperature channel. The temperature channel extends parallel to the pressure channel and is fluidly separate from the pressure channel. The temperature channel is configured to channel a fluid flow from the temperature orifice to the at least one exit port, which is configured to discharge the fluid flow into a second fluid stream.

A gas turbine engine extending along an axis includes a fan section having a number of rotor cascades and a number of stator cascades, a splitter downstream of the fan section and having an inner side, an outer side, and an inside surface, a compressor section downstream of the fan section, a combustor section downstream of the compressor section, a turbine section downstream of the combustor section and connected to the compressor and/or fan sections, and a probe assembly located on the compressor and/or fan section and configured to sense a pressure and a total temperature of a first airflow stream. The probe includes a probe head, a probe tip extending from the probe head and ending with a sensor face in fluidic communication with a first fluid stream, a pressure channel extending into the probe tip through the sensor face, a pressure sensor configured to sense a pressure in the pressure channel, a temperature channel extending into the probe tip through the sensor face with a temperature orifice located on the sensor face and at least one exit port distal from the sensor face, and a temperature sensor configured to sense a temperature in the temperature channel. The temperature channel extends parallel to the pressure channel and is fluidly separate from the pressure channel. The temperature channel is configured to channel a fluid flow from the temperature orifice to the at least one exit port, which is configured to discharge the fluid flow into a second fluid stream.

DETAILED DESCRIPTION

Figure 1:
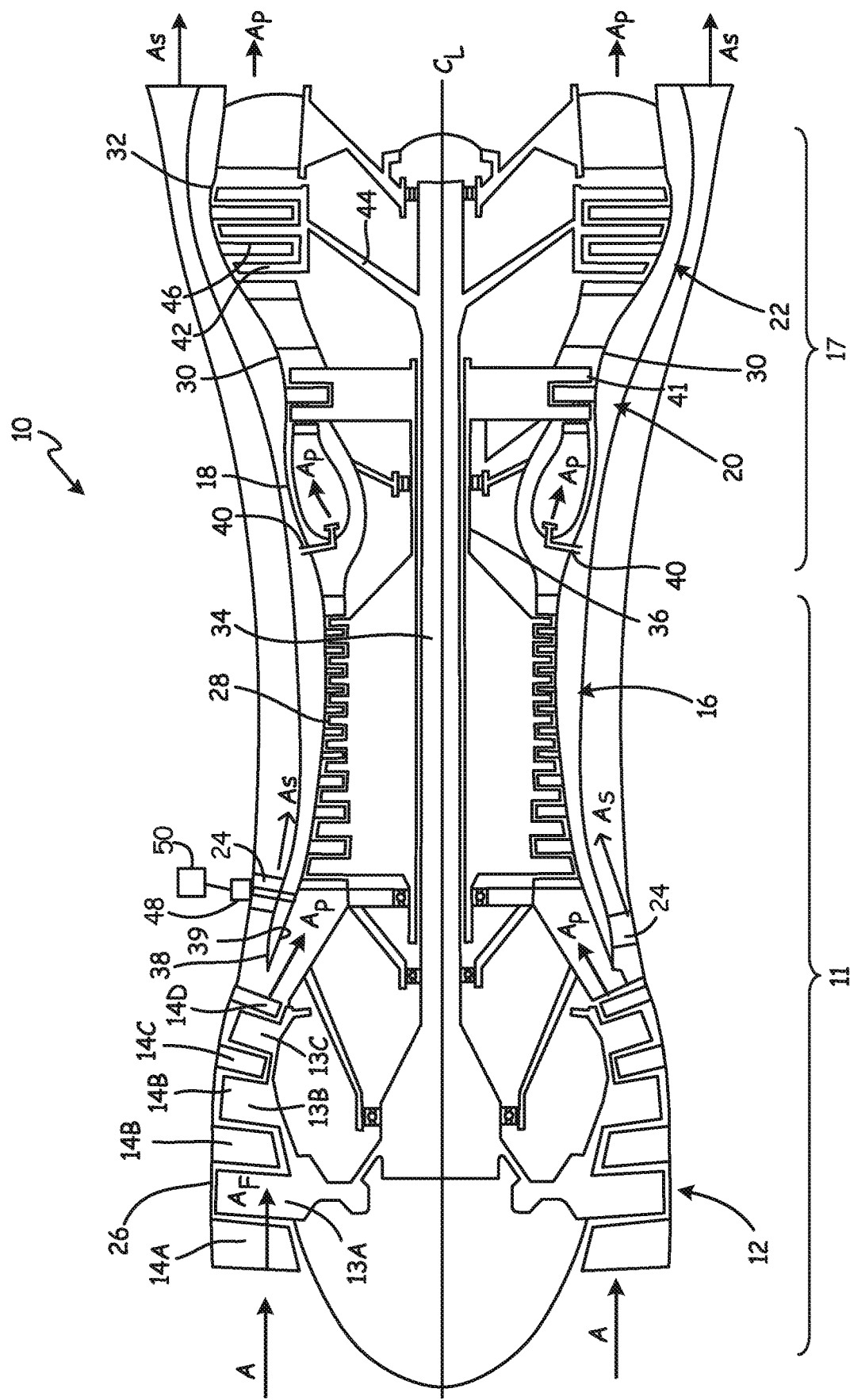
FIG. 1 is a schematic side cross-sectional view of an embodiment of a gas turbine engine.

FIG. 1 is a schematic side cross-section view of gas turbine engine 10. Although FIG. 1 depicts a gas turbine engine typically used for aircraft propulsion, the present disclosure is readily applicable to gas turbine generators and other similar systems incorporating rotor-supported, shaft-driven turbines. Shown in FIG. 1 are gas turbine engine 10, fan 12, fan rotor cascades 13A-13C, fan stator cascades 14A-14D, high pressure compressor (HPC) 16, combustor section 18, high pressure turbine (HPT) 20, low pressure turbine (LPT) 22, struts 24, fan case 26, HPC case 28, HPT case 30, LPT case 32, low pressure shaft 34, high pressure shaft 36, splitter 38, inside surface 39, injectors 40, HPT blades 41, LPT blades 42, support rotor 44, vane airfoil sections 46, probe assembly 48, engine control unit 50, inlet air A, fan air $A_F$, primary air $A_P$, secondary air $A_S$, and longitudinal engine centerline axis $C_L$. Gas turbine engine 10 can be described as having cold section 11 and hot section 17, as annotated in FIG. 1.

In the illustrated embodiment, gas turbine engine 10 comprises a dual-spool turbofan engine in which the advantages of the present disclosure are particularly well illustrated. Gas turbine engine 10, of which the operational principles are well known in the art, comprises cold section 11, including fan 12 and HPC 16, and hot section 17, including combustor section 18, HPT 20, and LPT 22. These components are each concentrically disposed around longitudinal engine centerline axis $C_L$. Fan 12 is separated from HPC 16 by a plurality of struts 24, and fan 12 is enclosed at its outer diameter within fan case 26. Likewise, the other engine components are correspondingly enclosed at their outer diameters within various engine casings, including HPC case 28, HPT case 30, and LPT case 32. Fan 12 is connected to LPT 22 through low pressure shaft 34, and together with fan 12, LPT 22, and low pressure shaft 34, comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 at fan 12. Fan 12 comprises fan rotor cascades 13A-13C which are rotated by LPT 22 through low pressure shaft 34 (either directly as shown or through a gearbox, not shown). In conjunction with fan stator cascades 14A-14D (between which fan rotor cascades 13A-13C are positioned, respectively), fan air $A_F$ is accelerated and compressed. At splitter 38, fan air $A_F$ is divided into streams of primary air $A_P$ (also known as gas path air) and secondary air $A_S$ (also known as bypass air). Secondary air $A_S$ produces a major portion of the thrust output of engine 10 while primary air $A_P$ is directed into HPC 16. HPC 16 includes pluralities of rotors and stators, alternately positioned, that incrementally step up the pressure of primary air $A_P$. HPC 16 is rotated by HPT 20 through high pressure shaft 36 to provide compressed air to combustor section 18. The compressed air is delivered to combustor section 18, along with fuel through injectors 40, such that a combustion process can be carried out to produce the high energy gases necessary to turn HPT 20 and LPT 22. Primary air $A_P$ continues through gas turbine engine 10 whereby it is typically passed through an exhaust nozzle to further produce thrust.

After being compressed in HPC 16 and participating in a combustion process in combustor section 18 to increase pressure and energy, primary air $A_P$ flows through HPT 20 and LPT 22 such that HPT blades 41 and LPT blades 42 extract energy from the flow of primary air $A_P$. Primary air $A_P$ impinges on HPT blades 41 to cause rotation of high pressure shaft 36, which turns HPC 16. Primary air $A_P$ also impinges on LPT blades 42 to cause rotation of support rotor 44 and low pressure shaft 34, which turns the rotating components of fan 12.

In addition, gas turbine engine 10 includes probe assembly 48. Probe assembly 48 begins exterior to fan case 26 and HPC case 28, extends through one of struts 24 and splitter 38, terminating flush with inside surface 39 of splitter 38 in fluid contact with primary air $A_P$ adjacent to the wall at the probe face. Thereby, probe assembly 48 can measure the static pressure and total temperature of primary air $A_P$ (i.e., the static primary air $A_P$ temperature plus the kinetic energy of primary air $A_P$). Probe assembly 48 is communicatively connected to engine control unit (ECU) 50 such that ECU 50 receives measurements from probe assembly 48. In the illustrated embodiment, probe assembly 48 is positioned downstream of fan rotor cascades 13A-13C and fan stator cascades 14A-14D and upstream of HPC 16, although in alternate embodiments, probe assembly 48 can be positioned in other locations, such as within HPC 16 or amongst fan rotor cascades 13 and fan stator cascades 14. Probe assembly 48 can also be referred to as a probe.

The components and configuration of gas turbine engine 10 as shown in FIG. 1 allow for ECU 50 to know the total temperature and static pressure of primary air $A_P$ as reported by probe assembly 48. ECU 50 can then use this information to control gas turbine engine 10 appropriately. Depicted in FIG. 1 is one embodiment of the present disclosure, to which there are alternative embodiments. For example, engine 10 can be a three spool engine. In such an embodiment, engine 10 has an intermediate compressor between fan 12 and HPC 16 and an intermediate turbine between HPT 20 and LPT 22, wherein the intermediate compressor is connected to the intermediate turbine with an additional shaft.

Figure 2:
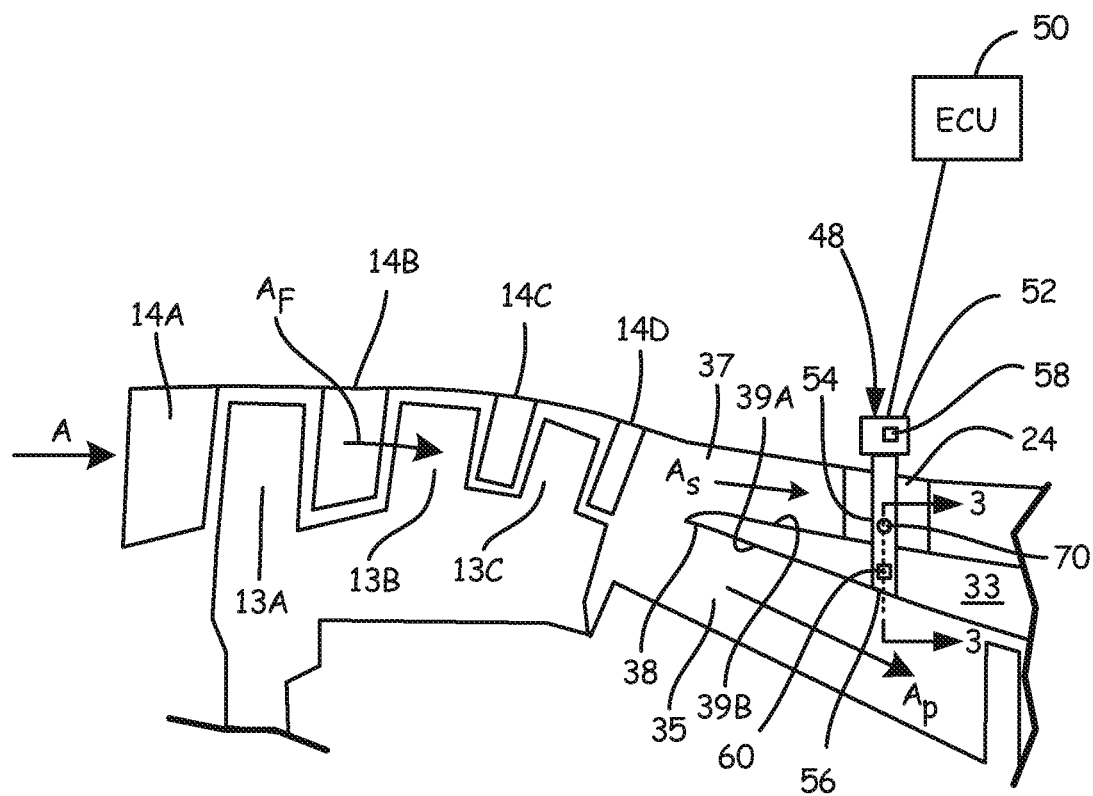
FIG. 2 is a schematic side cross-sectional view of the gas turbine engine proximate a probe assembly.

FIG. 2 is a schematic side cross-sectional view of gas turbine engine 10 proximate a probe assembly 48. Also shown in FIG. 2 are inner side 35 and outer side 37. At splitter 38, fan air $A_F$ is divided into streams of primary air $A_P$, flowing on inner side 35, and secondary air $A_S$, flowing on outer side 37. Probe assembly 48 comprises probe head 52 with probe tip 54 extending therefrom. At the innermost end of probe tip 54 is sensor face 56 which is tangent to inside surface 39 of splitter 38. Thereby, probe tip 54 extends at an acute, upstream angle from the flow of primary air $A_P$. In the illustrated embodiment sensor face 56 is flat, although in alternate embodiments sensor face 56 can be curved to closer match the contour of splitter 38. In addition, sensor face 56 is substantially flush with inside surface 39 of splitter 38 in that no part of sensor face 56 is more than 0.76 mm (0.030 inch) from being even with inside surface 39.

Probe assembly 48 also includes pressure sensor 58, located in probe head 52, and temperature sensor 60, located in probe tip 54. Pressure sensor 58 and temperature sensor 60 are each located within a respective channel (not shown in FIG. 2) and will be described in more detail later in FIGS. 3-4. In the illustrated embodiment, probe assembly 48 is positioned on fan case 26 and configured to sense a pressure and a total temperature of primary air $A_P$ (i.e., the primary airflow stream). In some embodiments temperature sensor 60 can be located near (i.e., proximate) sensor face 56, while in other embodiments, temperature sensor 60 can be located some distance away from sensor face 56 within a temperature channel. $A_S$ will be shown and described later in FIGS. 3-4, a flow of fluid past temperature sensor 60 can result in a more accurate indication of total temperature of primary air $A_P$. Pressure sensor 58 can be a pressure transducer that measures the static pressure of primary air $A_P$, and temperature sensor 60 can be a resistive temperature detector, such as a contact thermometer, that measures the total temperature of primary air $A_P$. The data from pressure sensor 58 and temperature sensor 60 is fed to ECU 50. Because the properties are measured at the boundary of the flow of primary air $A_P$, ECU 50 can do calculations to estimate the average properties of primary air $A_P$ across the primary air flowpath. In other embodiments, pressure sensor 58 can be routed elsewhere in or near ECU 50 by using a pneumatic line (not shown) leading from probe assembly 48 to a remote pressure transducer, thereby providing fluid communication between probe assembly 48 and a remote pressure transducer. This embodiment could be advantageous for harsh environments.

The components and configuration of gas turbine engine 10 allow for the static pressure and total temperature of primary air $A_P$ to be measured without the measurement devices protruding into the flowpath which prevents major flow disturbances due to probe assembly 48. In addition, the static pressure and total temperature data can be transmitted to ECU 50 for further processing and can be used to control gas turbine engine 10. In some embodiments, because of the flush mounted configuration, the sensed temperature differs from the center flow $A_P$ total temperature. This is due to the incomplete $A_P$ flow recovery as the flow comes to theoretical rest at the wall, and also due to wall heat conduction. A correction can be applied to account for this difference using empirical data or approximations based on flow velocity at the probe interface.

Figure 3:
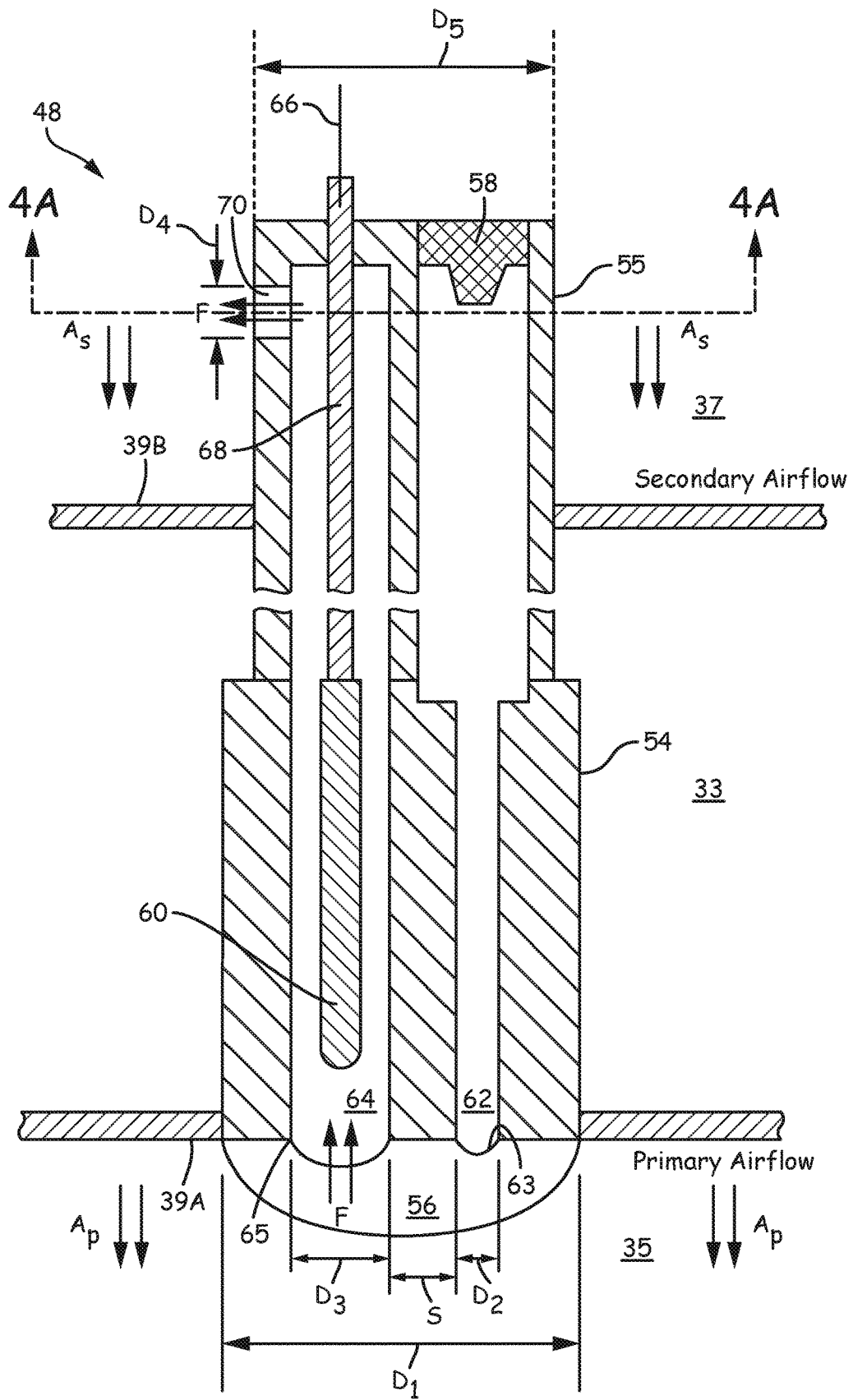
FIG. 3 is a cross-sectional front view of the probe assembly shown in FIG. 2 along line 3-3.

FIG. 3 is a cross-sectional front view of probe tip 54 along line 3-3 in FIG. 2. Shown in FIG. 3 are HPC case void 33, inner side 35, outer side 37, inside surfaces 39A, 39B, probe assembly 48, probe tip 54, probe shaft 55, sensor face 56, pressure sensor 58, temperature sensor 60, pressure channel 62, pressure orifice 63, temperature channel 64, temperature orifice 65, wires 66, shaft 68, and exit port 70. Also labeled in FIG. 3 are primary air $A_P$, secondary air $A_S$, temperature channel flow F, probe tip diameter $D_1$, pressure orifice diameter $D_2$, temperature orifice diameter $D_3$, exit port diameter $D_4$, probe shaft diameter $D_5$, and spacing S. In the illustrated embodiment, HPC case void 33 is a region between primary air $A_P$ and secondary air $A_S$, being defined by respective inside surfaces 39A and 39B, as shown in FIGS. 1-2. Probe assembly 48 shown in the illustrated embodiment is not drawn to scale, in order to provide a sufficient level of detail. In a practical embodiment, the length of probe shaft 55 (i.e., in a direction of pressure channel 62 and temperature channel 64) will be much greater than depicted. Pressure orifice 63 and temperature orifice 65 are each located on sensor face 56 in fluidic communication with primary air $A_P$. Pressure channel 62 and temperature channel 64 are beside each other, extending through probe tip 54 along substantially parallel axes (not labeled), with the center of pressure channel 62 being approximately aligned with the center of temperature channel 64 relative to the $C_L$ axis of engine 10, and with pressure channel 62 and temperature channel 64 being approximately perpendicular to $A_P$ flow. Pressure channel 62 begins at pressure orifice 63 in sensor face 56 and extends all of the way to probe head 52 (shown in FIG. 2). Pressure channel 62 is in fluidic communication with pressure sensor 58. Thereby, primary air $A_P$ enters and can exert a static pressure on pressure channel 62, the static pressure being measured by pressure sensor 58.

Temperature channel 64 begins at temperature orifice 65 in sensor face 56 and also extends toward probe head 52. Primary air $A_P$ entering temperature orifice 65 becomes temperature channel flow F, flowing through temperature channel 64 from temperature orifice 65, past temperature sensor 60, and out exit port 70 into secondary air $A_S$. In the illustrated embodiment, exit port 70 is located in secondary air $A_S$ on outer side 37, shown in FIG. 2, and is oriented laterally (i.e., perpendicular to centerline axis $C_L$, shown in FIG. 1). In some embodiments, more than one exit port 70 can be used. The location of one or more exit ports will be shown and described in more detail later, in FIGS. 4A-4B, 5A-5B, and 6A-6B. During operation of gas turbine engine 10, temperature channel flow F is driven by a pressure differential from temperature orifice 65 in primary air $A_P$ and exit port 70 in secondary air $A_S$. Temperature sensor 60 electronically communicates with probe head 52 via wires 66. Temperature sensor 60 further includes shaft 68 which extends into temperature channel 64 minimally contacting probe tip 54, which thermally isolates shaft 68 from probe tip 54. The flow of primary air $A_P$ can be affected by pressure orifice 63 and/or temperature orifice 65. In order to prevent interference of the flow into one orifice by the other orifice, the center of pressure orifice 63 is at the same axial location as the center of temperature orifice 65. In the illustrated embodiment, probe tip diameter $D_1$ is about 25 mm (1.0 inch), pressure orifice diameter $D_2$ is about 2.5 mm (0.10 inch), temperature orifice diameter $D_3$ is about 6.4 mm (0.25 inch), and exit port diameter $D_4$ is about 2.5 mm (0.10 inch). In the illustrated embodiment, probe tip 54 and probe shaft 55 are both circular in cross-sectional shape, with probe shaft diameter $D_5$ being slightly less than probe tip diameter $D_1$. In some embodiments, probe tip 54 and/or probe shaft 55 can have cross-sectional shapes that are non-round. Different configurations for probe shaft 55, including exemplary cross-sectional shapes, will be shown and described in more detail later, in FIGS. 4A-4B, 5A-5B, and 6A-6B. In a typical embodiment, pressure orifice 63 is spaced laterally apart from temperature orifice 65, because temperature channel flow F through temperature channel 64 can be significant, thereby potentially disrupting the static pressure at pressure orifice 63. Spacing S between the proximate sides of pressure orifice 63 and temperature orifice 65 is between about 0.5-2 times temperature orifice diameter $D_3$. In the illustrated embodiment, spacing S is about 4.98 mm (0.196 inch). The components and configuration of probe assembly 48 allow for the static pressure and total temperature of primary air $A_P$ to be measured by a single, compact device. In addition, the measurements can be taken accurately without the flow at pressure channel 62 being disturbed by the flow of primary air $A_P$ into temperature channel 64.

Figure 4A:
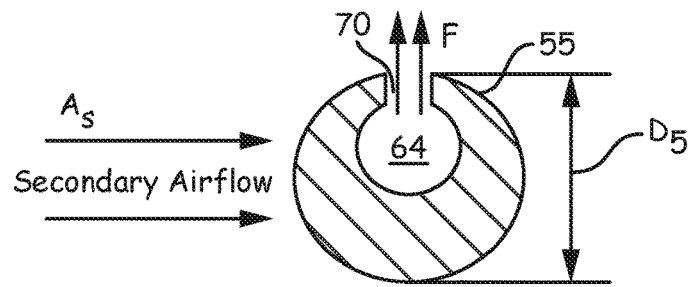
FIG. 4A is a cross-sectional top view of the probe shaft shown in FIG. 3 along line 4A-4A.

FIG. 4A is a cross-sectional top view of probe shaft 55 shown in FIG. 3 along line 4A-4A. Temperature channel flow F exits temperature channel 64 through exit port 70. Secondary air $A_S$ flowing past probe shaft 55 having probe shaft diameter $D_5$ can be modeled as airflow over a cylinder, whereby surface pressure (i.e., pressure at a surface of probe shaft 55) is lowest at points perpendicular to the direction of secondary air $A_S$. Bernoulli's principle is known in the fluid arts as explaining this phenomenon. Accordingly, exit port 70 is located at a point on past probe shaft 55 that discharges temperature channel flow F in a direction that is about perpendicular to secondary air $A_S$. Therefore, temperature sensor 60 of probe assembly 48 can be used to measure temperature of primary air $A_P$ even in an embodiment where the static pressures of primary air $A_P$ and secondary air $A_S$ are about the same because of the aforementioned effect.

Figure 4B:
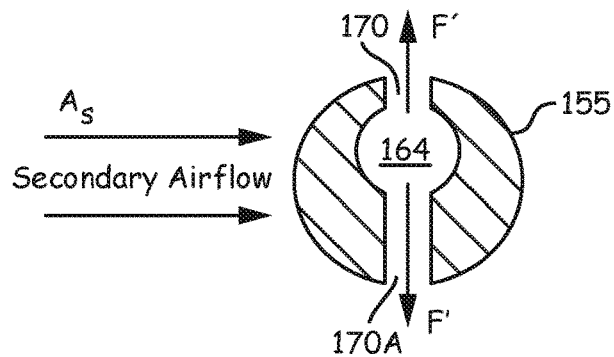
FIG. 4B is a cross-sectional top view of a second embodiment of the probe shaft shown in FIG. 3 along line 4A-4A.

As noted above in the description of FIG. 3, other configurations of probe shaft 55 and/or exit port 70 are possible. FIG. 4B is a cross-sectional top view of a second embodiment of probe shaft 55 shown in FIG. 3 along line 4A-4A. Temperature channel flow F through temperature channel 164 through exit ports 170 and 170A, each located opposite the other and configured to discharge exit port flow F', each being about half the flow of temperature channel flow F. FIG. 4B depicts an exemplary embodiment of probe assembly 48 having two exit ports 170, 170A from temperature channel 164. In some embodiments, three or more exit ports can be used on temperature channel 164. In various embodiments, exit ports can be located at various radial positions around probe shaft 155, with the positions being selected to achieve a desired temperature channel flow F for a design operating condition of gas turbine engine 10. Additionally, exit port diameter $D_4$ and/or the radial locations of exit ports can also be changed in different embodiments to achieve a desired temperature channel flow F. Several factors can be considered in determining an optimum temperature channel flow F for a particular embodiment, in order to optimize the performance of temperature probe 48 (i.e., the performance of temperature sensor 60). For example, a small value of temperature channel flow F can result in a slow response time, whereas a large value of temperature channel flow F can increase recovery error, which is the difference between the probe's measured air temperature and total air temperature.

Figure 5A:
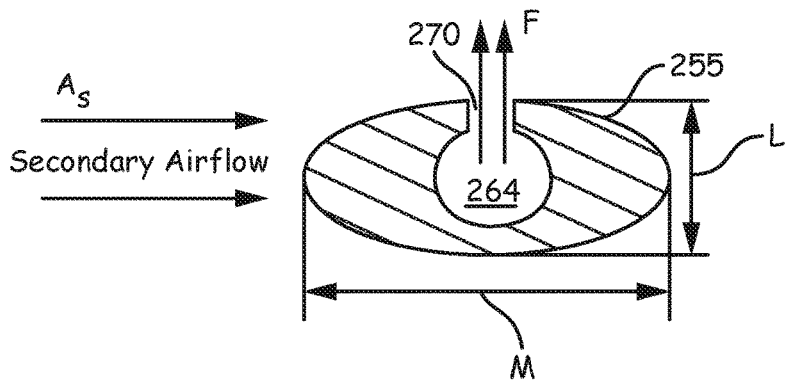
FIG. 5A is a cross-sectional top view of a third embodiment of the probe shaft shown in FIG. 3 along line 4A-4A.

FIG. 5A is a cross-sectional top view of a third embodiment of probe shaft 55 shown in FIG. 3 along line 4A-4A. Temperature channel flow F exits temperature channel 264 through exit port 270 in a direction that is perpendicular to that of secondary air $A_S$ flowing past probe shaft 255. In the illustrated embodiment, probe shaft 255 has a cross-sectional shape that is elliptical, and can be characterized by major dimension M and minor dimension L, as labeled. In the illustrated embodiment, a ratio of major dimension M to minor dimension L is about 2.2. In some embodiments, the ratio of major dimension M to minor dimension L can range from about 1-3. In other embodiments, the ratio of major dimension M to minor dimension L can be greater than 3. In yet other embodiments, the cross-sectional shape of probe shaft 255 can be oval, oblong, egg-shaped, or any other non-circular geometric shape. Probe shaft 255 having a non-round cross-sectional shape can be particularly beneficial in some embodiments in defining a flow and/or pressure profile of secondary air $A_S$ (i.e., secondary airflow) over probe shaft 255. Moreover, the flow and/or pressure profile of secondary air $A_S$ in the vicinity of exit port 270 can be particularly beneficial in some embodiments. Other exemplary cross-sectional shapes of probe shaft 255 will be shown and described later, in FIGS. 6A-6B.

Figure 5B:
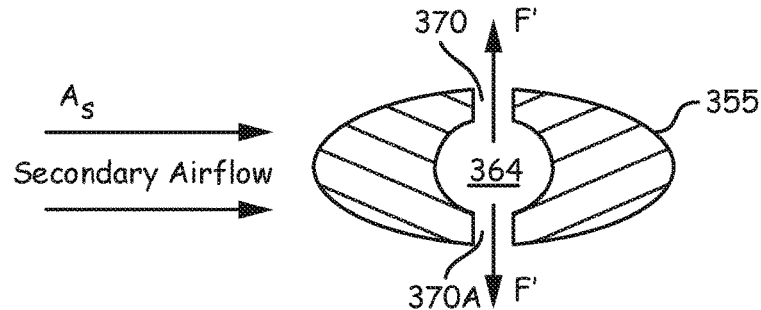
FIG. 5B is a cross-sectional top view of a fourth embodiment of the probe shaft shown in FIG. 3 along line 4A-4A.

FIG. 5B is a cross-sectional top view of a fourth embodiment of probe shaft 55 shown in FIG. 3 along line 4A-4A. Temperature channel flow F through temperature channel 364 through exit ports 370 and 370A on probe shaft 355, each located opposite the other and configured to discharge exit port flow F', each being about half the flow of temperature channel flow F. The description of the cross-sectional shape of probe shaft 355 is substantially similar to that provided above in regard to FIG. 5A. The descriptions of exit ports 370 and 370A, including various embodiments thereof, are substantially similar to those provided above in regard to FIG. 4B.

Figure 6A:
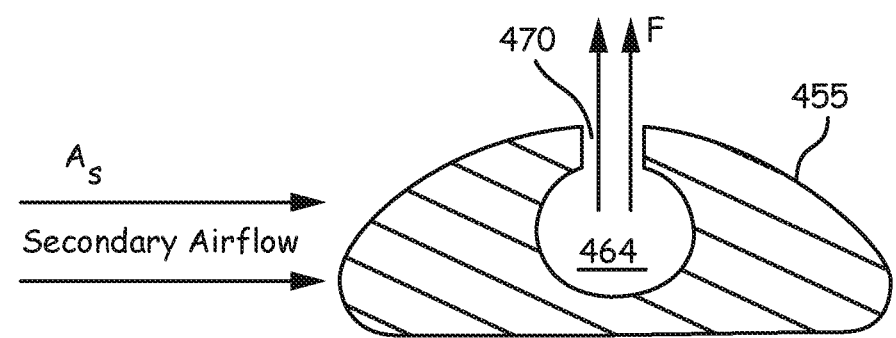
FIG. 6A is a cross-sectional top view of a fifth embodiment of the probe shaft shown in FIG. 3 along line 4A-4A.

FIG. 6A is a cross-sectional top view of a fifth embodiment of probe shaft 55 shown in FIG. 3 along line 4A-4A. Temperature channel flow F exits temperature channel 464 through exit port 470 in a direction that is perpendicular to that of secondary air $A_S$ flowing past probe shaft 455. In the illustrated embodiment, probe shaft 455 has an asymmetrical airfoil cross-sectional shape, with exit port 470 being located on the "lift" side (i.e., high speed, reduced pressure side) of probe shaft 455. In the illustrated embodiment, temperature channel flow F exits temperature channel 464 through exit port 470 in a direction that is perpendicular to that of secondary air $A_S$ flowing past probe shaft 455 on the "lift" side of the airfoil shape (i.e., near the side of lower relative pressure). In other embodiments, one or more exit ports can be located at other positions around the perimeter of probe shaft 455. In various embodiments, the cross-sectional shape of probe shaft 455 and/or the location of one or more exit ports 470 can be selected to provide a desired temperature channel flow F based on a particular operating condition of gas turbine engine 10. In some embodiments, the cross-sectional shape of probe shaft 455 can causes an appreciable "lift" force that can result in a lateral force on probe shaft 455 during the operation of gas turbine engine 10. Accordingly, the materials and structural design of probe shaft 455 must be able to accommodate the "lift" force that results from an asymmetrical cross-sectional shape.

Figure 6B:
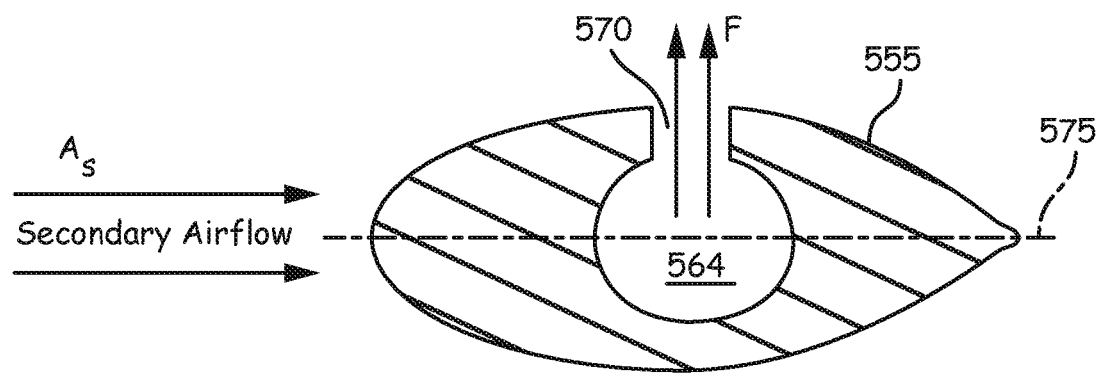
FIG. 6B is a cross-sectional top view of a sixth embodiment of the probe shaft shown in FIG. 3 along line 4A-4A.

FIG. 6B is a cross-sectional top view of a sixth embodiment of probe shaft 55 shown in FIG. 3 along line 4A-4A. Temperature channel flow F exits temperature channel 564 through exit port 570 in a direction that is perpendicular to that of secondary air $A_S$ flowing past probe shaft 555. In the illustrated embodiment, probe shaft 555 has a symmetrical airfoil cross-sectional shape (i.e., symmetrical about axis 575 that is perpendicular to the flow direction of secondary air $A_S$). This can also be referred to as a symmetrical airfoil, or as having a teardrop cross-sectional shape. A benefit of a symmetrical airfoil shape is that a high velocity of secondary air $A_S$ can be developed at the vicinity of exit port 570, while not developing a "lift" force that can cause a lateral force on probe shaft 555 (as described in regard to probe shaft 455 shown in FIG. 6A). In other embodiments, one or more exit ports can be located at other positions around the perimeter of probe shaft 555. In various embodiments, the cross-sectional shape of probe shaft 555 and/or the location of one or more exit ports 570 can be selected to provide a desired temperature channel flow F based on a particular operating condition of gas turbine engine 10. $A_S$ described above in regard to FIG. 5A, various non-round cross-sectional shapes can be particularly beneficial in some embodiments in defining the flow and/or pressure profiles of secondary air $A_S$ (i.e., secondary airflow) over probe shaft 255, etc. and/or in the vicinity of exit ports 270, etc. All non-round cross-sectional shapes of probe shaft 255 are within the scope of the present disclosure. Moreover, all configurations of exit ports 70 with regard to number, size, and/or placement on probe shaft 255 are within the scope of the present disclosure.

Figure 7:
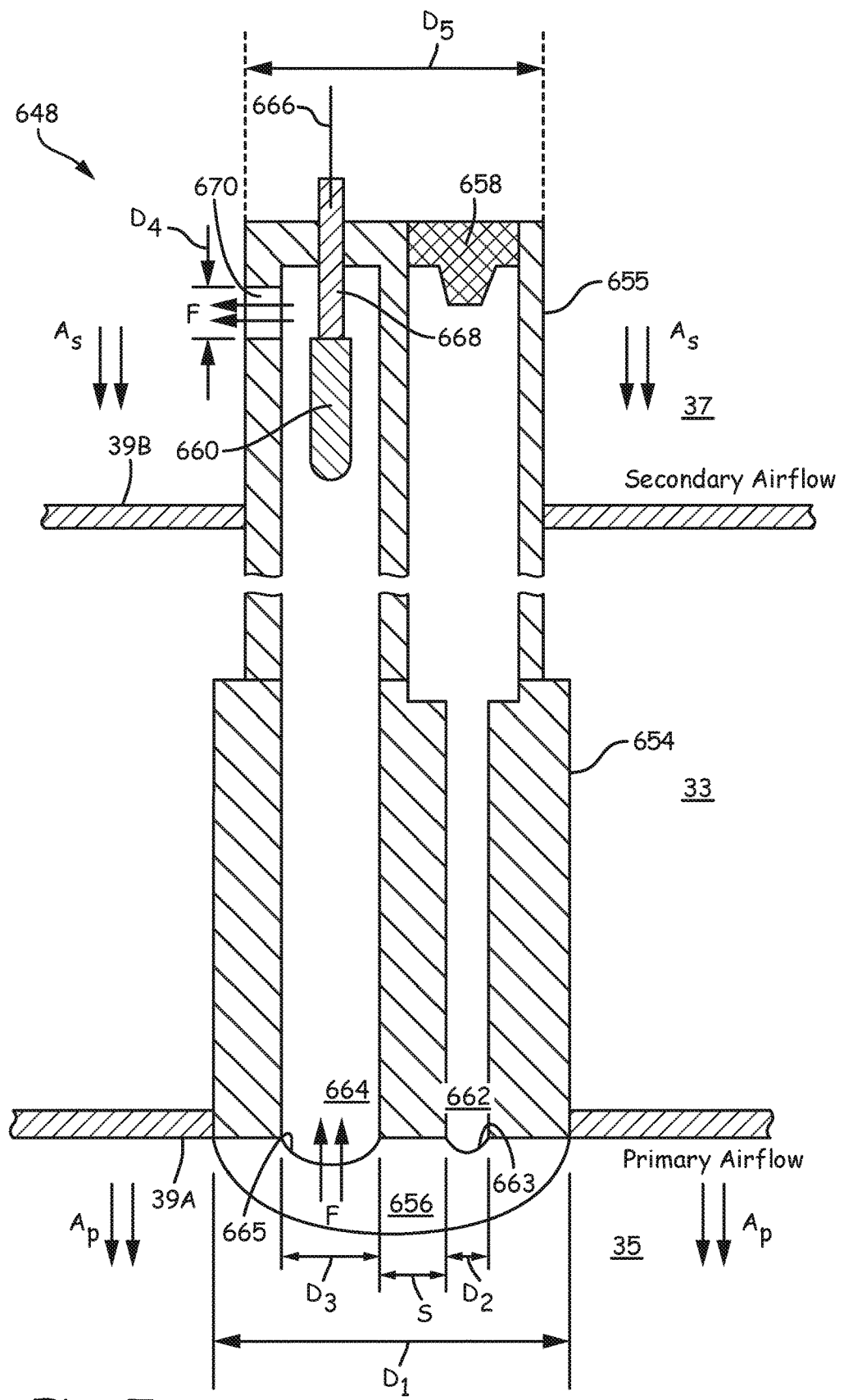
FIG. 7 is a cross-sectional front view of a second embodiment of the probe assembly shown in FIG. 2 along line 3-3.

FIG. 7 is a cross-sectional front view of a second embodiment of probe assembly 48 shown in FIG. 2 along line 3-3. Shown in FIG. 7 are HPC case void 33, inner side 35, outer side 37, inside surfaces 39A, 39B, probe assembly 648, probe shaft 655, sensor face 656, pressure sensor 658, temperature sensor 660, pressure channel 662, pressure orifice 663, temperature channel 664, temperature orifice 665, wires 666, shaft 668, and exit port 670, all having a description substantially similar to that provided above in regard to FIG. 3. In the illustrated embodiment, temperature sensor 660 is located higher in temperature channel 664 (i.e., further away from sensor face 656), nearer exit port 670 than temperature sensor shown in FIG. 3. Accordingly, temperature sensor 660 measures the temperature of temperature channel flow F at a point much nearer exit port 670 than in the embodiment shown in FIG. 3. An advantage of probe assembly 648 is that a much shorter shaft 668 is required to support temperature sensor 660, which can provide greater structural stability of temperature sensor 660. This can be beneficial in an embodiment where temperature probe 660 is susceptible to vibration, flow turbulence, and the like. However, temperature sensor 660 can experience a time lag, particularly when the temperature of primary air $A_P$ is changing rapidly, as a result of the transport time of temperature channel flow F through temperature channel 664 from temperature orifice 665 to temperature sensor 660.

Temperature probe 48, 648 of the present disclosure measures temperature of a primary air $A_P$ using temperature sensor 60, 660 that is recessed in temperature channel 64, etc. (i.e., recessed from the primary air $A_P$ stream) because of channel flow F through temperature channel 64, etc. Channel flow F is induced by a pressure differential between temperature orifice 65, 665 in primary air $A_P$ and exit port 70, 670 in secondary air $A_S$. Primary air $A_P$ can be referred to as a first stream, and secondary air $A_S$ can be referred to as a second stream. Accordingly, a pressure differential between the first stream and the second stream induces channel flow F through temperature channel 64, etc. In some embodiments, the first stream can be at a higher pressure than the second stream. In some of these embodiments, the first stream can be at a significantly higher pressure than the second stream. Accordingly, in these embodiments, the configuration of exit ports 70, etc., can be to minimize flow turbulence, vortex shedding, and so forth (i.e., flow disturbances). Moreover, in various embodiments, the cross-sectional shape (i.e., profile) of probe shaft 255, etc., can be configured to control and/or minimize flow disturbances. These various embodiments can be referred to as one or more flow enhancement features. In other embodiments, and/or during some operating conditions, a minimal pressure differential can exist between the first stream and the second stream. In some of these embodiments, the first stream and the second stream can have the same static pressure. In an exemplary embodiment, the first stream and the second stream can be driven by the same prime mover. Therefore, in some embodiments, channel flow F through temperature channel 64, etc., is induced by the orientation of temperature orifice 65, 665 and the orientation of exit port/ports 70, etc. Accordingly, in these other embodiments, the configuration of exit ports 70, etc., can be to promote the induction of channel flow F through temperature channel 64, etc. For these reasons, the configuration of exit ports 70, etc. with regard to size, placement, and/or number, can be to enhance channel flow F, and the exit ports can also be referred to as one or more flow enhancement features. While a gas turbine engine was depicted as an exemplary embodiment of temperature probe 48, the scope of the present disclosure includes all embodiments where a flush-mount combined static pressure and temperature probe is used to measure a temperature or a total temperature of a first stream by inducing a flow of fluid from a first stream to a second stream. Each of the first and/or second streams can be gaseous or liquid. Air and exhaust gas are non-limiting examples of a gas; and fuel, oil, water, and aqueous solutions are non-limiting examples of a liquid.

Discussion of Possible Embodiments

The following are non-exclusive descriptions of possible embodiments of the present invention.

A probe, comprising a probe head; a probe tip extending from the probe head and ending with a sensor face configured for fluidic communication with a first fluid stream; a pressure channel extending into the probe tip through the sensor face; a pressure sensor in configured to sense a pressure in the pressure channel; a temperature channel extending into the probe tip through the sensor face, the temperature channel including a temperature orifice disposed on the sensor face and at least one exit port distal from the sensor face; and a temperature sensor configured to sense a temperature in the temperature channel; wherein: the temperature channel extends parallel to the pressure channel; the temperature channel is fluidly separate from the pressure channel; the temperature channel is configured to channel a fluid flow from the temperature orifice to the at least one exit port; and the at least one exit port is configured to discharge the fluid flow into a second fluid stream.

The probe of the preceding paragraph can optionally include, additionally and/or alternatively, any one or more of the following features, configurations and/or additional components:

A further embodiment of the foregoing probe, wherein: the second fluid stream defines a second fluid stream direction; and at least one exit port establishes an exit flow direction that is perpendicular to the second fluid stream direction.

A further embodiment of the foregoing probe, comprising two exit ports, one on an opposite side of the temperature channel from the other.

A further embodiment of the foregoing probe, wherein the pressure sensor is a static pressure sensor.

A further embodiment of the foregoing probe, wherein the temperature sensor is a total temperature sensor.

A further embodiment of the foregoing probe, further comprising a probe shaft, the probe shaft disposed between the sensor face and the probe head, wherein the at least one exit ports are disposed on the probe shaft.

A further embodiment of the foregoing probe, wherein: the probe shaft defines a probe shaft cross-sectional shape; and the probe shaft cross-sectional shape is circular.

A further embodiment of the foregoing probe, wherein: the probe shaft defines a probe shaft cross-sectional shape; the probe shaft cross-sectional shape is non-circular, defining a major width and a minor width; and the major width defines a major axis that is parallel to the second fluid stream direction.

A further embodiment of the foregoing probe, wherein the probe shaft cross-sectional shape is an ellipse, oval, airfoil, or teardrop shape.

A further embodiment of the foregoing probe, wherein the at least one exit port is configured to create a negative pressure on the temperature channel with respect to the temperature orifice, thereby inducing the fluid flow from the temperature orifice to the at least one exit port.

A further embodiment of the foregoing probe, wherein the first fluid stream is at a pressure greater than the second airflow stream.

A further embodiment of the foregoing probe, wherein: the first fluid stream is air; the second fluid stream is air; and the probe is configured to measure a static pressure and a total temperature in a primary airstream in a gas turbine engine.

A further embodiment of the foregoing probe, further comprising a gas turbine engine extending along an axis comprising: a fan section comprising a plurality of rotor cascades and a plurality of stator cascades; a compressor section downstream of the fan section; a combustor section downstream of the compressor section; and a turbine section downstream of the combustor section, the turbine section being connected to the compressor and/or fan section; wherein the probe is disposed on the compressor and/or fan section and is configured to sense a pressure and a total temperature of a first airflow stream.

A gas turbine engine extending along an axis comprising: a fan section comprising a plurality of rotor cascades and a plurality of stator cascades; a splitter downstream of the fan section, the splitter including inner side, an outer side, and an inside surface; a compressor section downstream of the fan section; a combustor section downstream of the compressor section; a turbine section downstream of the combustor section, the turbine section being connected to the compressor and/or fan sections; and a probe assembly, disposed on the compressor and/or fan section and configured to sense a pressure and a total temperature of a first airflow stream, the probe assembly comprising: a probe head; a probe tip extending from the probe head and ending with a sensor face configured for fluidic communication with a first fluid stream; a pressure channel extending into the probe tip through the sensor face; a pressure sensor configured to sense the pressure in the pressure channel; a temperature channel extending into the probe tip through the sensor face, the temperature channel including a temperature orifice disposed on the sensor face and at least one exit port distal from the sensor face; and a temperature sensor configured to sense the temperature in the temperature channel; wherein: the temperature channel extends parallel to the pressure channel; the temperature channel is fluidly separate from the pressure channel; the temperature channel is configured to channel air from the temperature orifice to the at least one exit port; and the at least one exit port is configured to discharge the airflow into a second airstream.

The gas turbine engine of the preceding paragraph can optionally include, additionally and/or alternatively, any one or more of the following features, configurations and/or additional components:

A further embodiment of the foregoing gas turbine engine, wherein the pressure sensor is a static pressure sensor.

A further embodiment of the foregoing gas turbine engine, wherein the sensor face offset no more than 0.76 mm (0.030 inch) from the inside surface of the splitter.

A further embodiment of the foregoing gas turbine engine, wherein the temperature channel includes an outlet positioned inside of the splitter.

A further embodiment of the foregoing gas turbine engine, wherein the temperature channel includes an outlet positioned outside of the splitter.

A further embodiment of the foregoing gas turbine engine, wherein a center of the temperature channel at the sensor face is in substantially the same axial position as a center of the pressure channel at the sensor face.

A further embodiment of the foregoing gas turbine engine, wherein: the at least one exit port is configured to discharge the fluid flow into a second airflow stream; the second airflow stream defines a second airflow stream direction; and at least one exit port establishes an exit flow direction that is perpendicular to the second airflow stream direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A probe comprising:
a probe head;
a probe tip extending from the probe head and ending with a sensor face configured for fluidic communication with a first fluid stream;
a pressure channel extending into the probe tip through the sensor face;
a pressure sensor configured to sense a pressure in the pressure channel;
a temperature channel extending into the probe tip through the sensor face, the temperature channel including a temperature orifice disposed on the sensor face and at least one exit port distal from the sensor face; and
a temperature sensor configured to sense a temperature in the temperature channel;
wherein:
the temperature channel extends parallel to the pressure channel;
the temperature channel is fluidly separate from the pressure channel;
the temperature channel is configured to channel a fluid flow from the temperature orifice to the at least one exit port; and
the at least one exit port is configured to discharge the fluid flow into a second fluid stream.

2. The probe of claim 1, wherein:
the second fluid stream defines a second fluid stream direction; and
at least one exit port establishes an exit flow direction that is perpendicular to the second fluid stream direction.

3. The probe of claim 2, comprising two exit ports, one on an opposite side of the temperature channel from the other.

4. The probe of claim 1, wherein the pressure sensor is a static pressure sensor.

5. The probe of claim 1, wherein the temperature sensor is a total temperature sensor.

6. The probe of claim 1, further comprising a probe shaft, the probe shaft disposed between the sensor face and the probe head, wherein the at least one exit ports are disposed on the probe shaft.

7. The probe of claim 6, wherein:
the probe shaft defines a probe shaft cross-sectional shape; and
the probe shaft cross-sectional shape is circular.

8. The probe of claim 6, wherein:
the probe shaft defines a probe shaft cross-sectional shape;
the probe shaft cross-sectional shape is non-circular, defining a major width and a minor width; and
the major width defines a major axis that is parallel to the second fluid stream direction.

9. The probe of claim 8, wherein the probe shaft cross-sectional shape is an ellipse, oval, airfoil, or teardrop shape.

10. The probe of claim 6, wherein the at least one exit port is configured to create a negative pressure on the temperature channel with respect to the temperature orifice, thereby inducing the fluid flow from the temperature orifice to the at least one exit port.

11. The probe of claim 1, wherein the first fluid stream is at a pressure greater than the second fluid stream.

12. The probe of claim 1, wherein:
the first fluid stream is air;
the second fluid stream is air; and
the probe is configured to measure a static pressure and a total temperature in a primary airstream in a gas turbine engine.

13. A gas turbine engine extending along an axis comprising:
a fan section comprising a plurality of rotor cascades and a plurality of stator cascades;
a compressor section downstream of the fan section;

a combustor section downstream of the compressor section;
a turbine section downstream of the combustor section, the turbine section being connected to the compressor and/or fan section; and
the probe of claim 1;
wherein the probe is disposed on the compressor and/or fan section and is configured to sense a pressure and a total temperature of a first airflow stream.

14. A gas turbine engine extending along an axis comprising:
a fan section comprising a plurality of rotor cascades and a plurality of stator cascades;
a splitter downstream of the fan section, the splitter including inner side, an outer side, and an inside surface;
a compressor section downstream of the fan section;
a combustor section downstream of the compressor section;
a turbine section downstream of the combustor section, the turbine section being connected to the compressor and/or fan sections; and
a probe assembly, disposed on the compressor and/or fan section and configured to sense a pressure and a total temperature of a first airflow stream, the probe assembly comprising:
a probe head;
a probe tip extending from the probe head and ending with a sensor face configured for fluidic communication with a first fluid stream;
a pressure channel extending into the probe tip through the sensor face;
a pressure sensor configured to sense the pressure in the pressure channel;
a temperature channel extending into the probe tip through the sensor face, the temperature channel including a temperature orifice disposed on the sensor face and at least one exit port distal from the sensor face; and
a temperature sensor configured to sense the temperature in the temperature channel;
wherein:
the temperature channel extends parallel to the pressure channel;
the temperature channel is fluidly separate from the pressure channel;
the temperature channel is configured to channel air from the temperature orifice to the at least one exit port; and
the at least one exit port is configured to discharge the airflow into a second airstream.

15. The gas turbine engine of claim 14, wherein the pressure sensor is a static pressure sensor.

16. The gas turbine engine of claim 15, wherein a center of the temperature channel at the sensor face is in substantially the same axial position as a center of the pressure channel at the sensor face.

17. The gas turbine engine of claim 15, wherein:
the at least one exit port is configured to discharge the fluid flow into a second airflow stream;
the second airflow stream defines a second airflow stream direction; and
at least one exit port establishes an exit flow direction that is perpendicular to the second airflow stream direction.

18. The gas turbine engine of claim 14, wherein the sensor face offset no more than 0.76 mm (0.030 inch) from the inside surface of the splitter.

19. The gas turbine engine of claim 14, wherein the temperature channel includes an outlet positioned inside of the splitter.

20. The gas turbine engine of claim 14, wherein the temperature channel includes an outlet positioned outside of the splitter.

* * * * *